Sept. 4, 1951  H. A. H. J. SCHAFFNER  2,566,751
OPTICAL SYSTEM FOR DUAL BEAM MOTORCAR HEADLIGHTS
Filed March 12, 1946  7 Sheets-Sheet 1
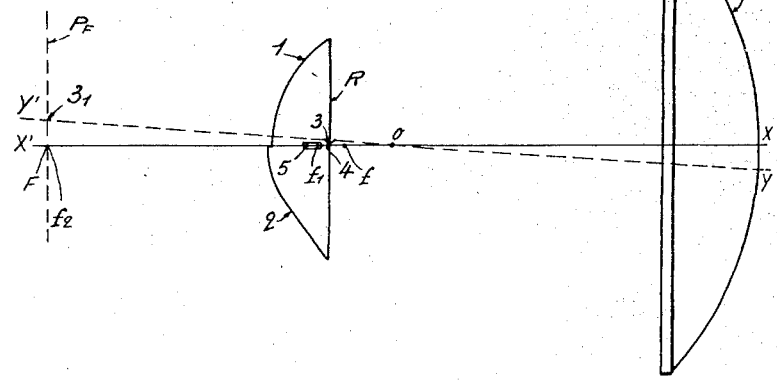
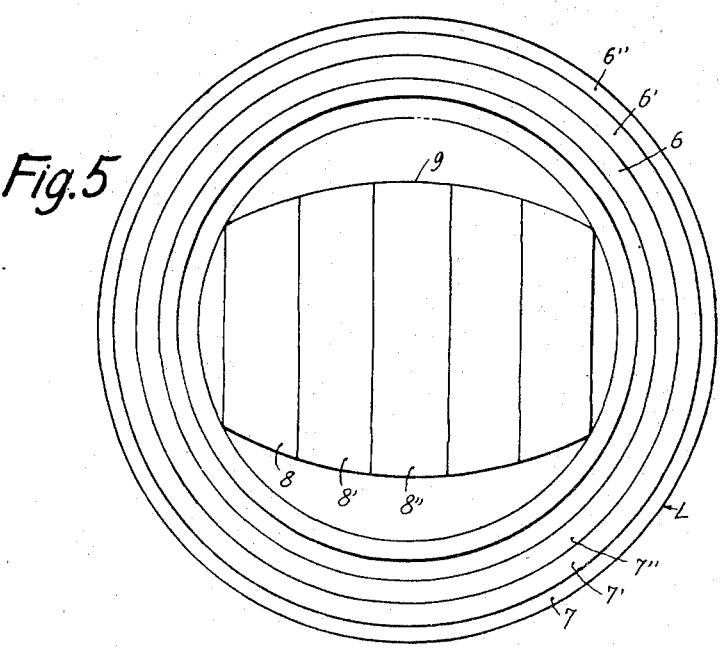
Inventor
H.A.H.J. Schaffner

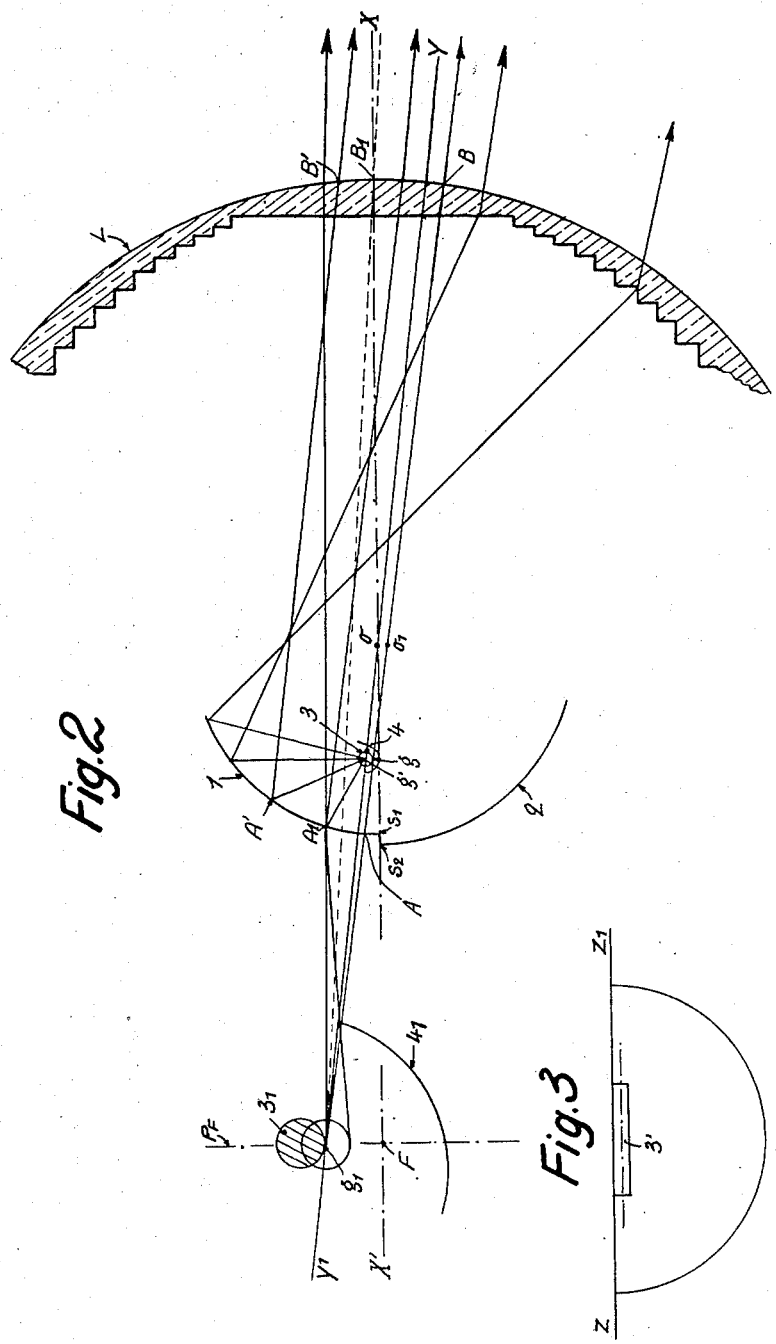

Sept. 4, 1951  H. A. H. J. SCHAFFNER  2,566,751
OPTICAL SYSTEM FOR DUAL BEAM MOTORCAR HEADLIGHTS
Filed March 12, 1946  7 Sheets-Sheet 5

Inventor
H. A. H. J. Schaffner
By Glascock Downing Seebold
attys.

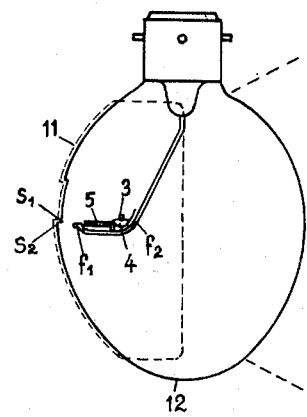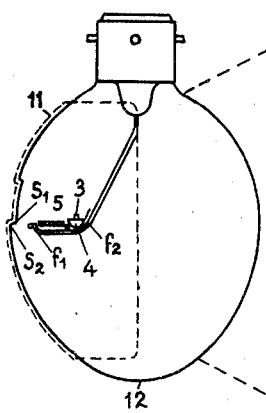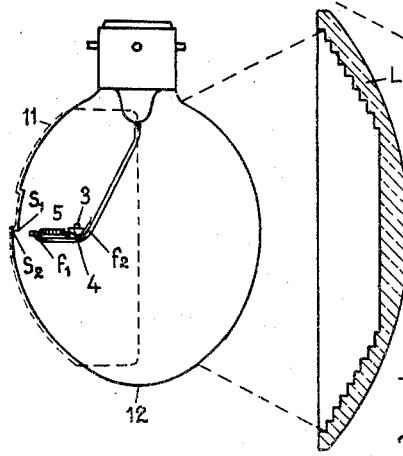

Sept. 4, 1951     H. A. H. J. SCHAFFNER     2,566,751
OPTICAL SYSTEM FOR DUAL BEAM MOTORCAR HEADLIGHTS
Filed March 12, 1946     7 Sheets-Sheet 7
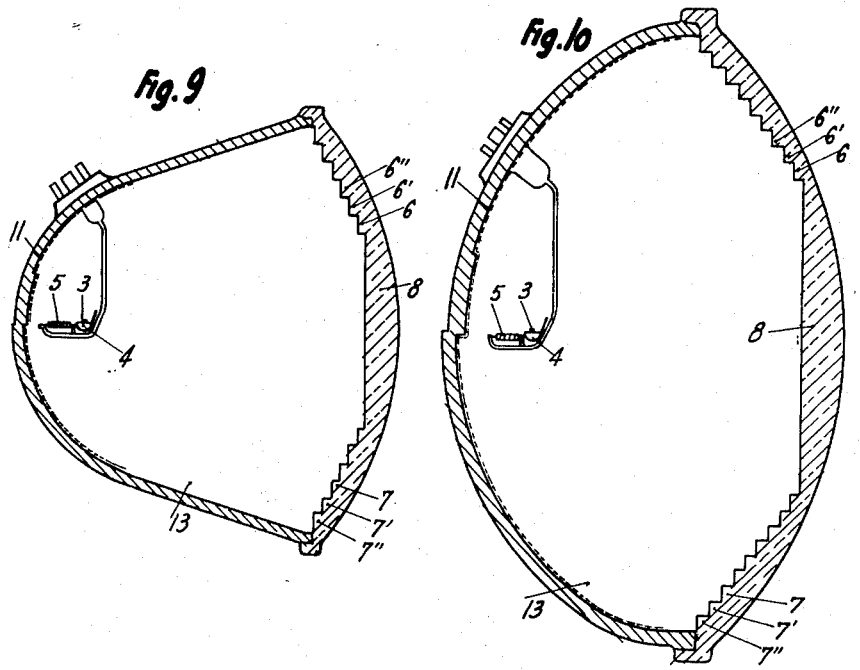

Patented Sept. 4, 1951

2,566,751

UNITED STATES PATENT OFFICE 2,566,751

OPTICAL SYSTEM FOR DUAL BEAM MOTORCAR HEADLIGHTS

Henri Alexandre Hippolyte Joseph Schaffner, Paris, France

Application March 12, 1946, Serial No. 653,804
In France March 15, 1945

13 Claims. (Cl. 240—41.3)

The present invention relates to a compound headlight for motorcars, or for any other vehicle, comprising two light sources, which supply long distance roadlighting and dipped courtesy illumination respectively.

In this type of headlights, efforts are made to obtain powerful, widely spread and non-dazzling courtesy illumination, the beam being accordingly delimited by a somewhat downwardly directed plane so as to show in vertical section in the region of maximum intensity a straight horizontal sharp or diffused boundary plane. It is of utmost importance that this sharply defined boundary plane be not altered by the tolerances arising from the positioning of the incandescent filament with respect to the optical axis. In the conventional optical systems, the lack of aplanatism hinders the formation of a straight boundary plane even with the use of straight transverse filaments and necessitates the use of axial dip filaments positioned in cups which screen the lower half of the luminous flux, the filament being placed out of focus with respect to the reflector. In this arrangement, according to whether the filament approaches one or the other of the axial tolerance limits either a black spot below the sharply defined boundary plane or a glare spot or a brush light above this boundary plane arises in the axis of the dip beam. By a careful choice of the lamp to be employed, and due to precise adjustments, it is possible to obtain either a very weak black central spot, and thus a sharply defined beam having no ascending rays, as is required by the European rules, or a weak brush light spot situated above the boundary plane, making it possible, by means of horizontal diffusing steps provided on the outlet headlight lens, an approximately spreading boundary plane, according to American practice. Nevertheless, a simple replacement of the lamp produces a complete change in this arrangement, because of the tolerances in the positioning of the filament of the lamp the central black spot may be transformed into a brush light and vice versa.

As far as long distance road lighting is concerned, efforts are made to obtain a wide powerful beam having a central spot with a high intensity gradually diminishing toward its periphery. The diameter of the outlet face of the lamp should, therefore, be as small as possible to permit the headlamps to be easily placed in the body of the car, and thus reduce the manufacturing costs to a minimum.

This double problem has been partially solved in the headlight described in my U. S. A. Patent No. 2,112,411 which shows a lamp with a reflector having a substantially aplanatic vertex zone, for example a spherical reflector and a double filament lamp, one of the filaments being employed for dip illumination and placed transversely to the optical axis in a small screening cup, the two filaments being positioned between the vertex and the focus of the reflector, and an outlet lens comprising two different sections having distinct foci coincident with the images of the two sources formed by the aplanatic vertex zone of the reflector, respectively.

In this device, the luminous flux of the dip light filament, after being reflected by the upper portion of the reflector, issues from the central part of the lens and from a zone, the area of which is smaller than the half of the annular marginal zone of this lens, whereas the flux from the road light filament, after being reflected over the whole of the reflecting surface, issues through the entire lens face.

By reason of the focal location of the two filaments, this device provides for the formation of high axial intensity dip and road lights which cover, therefore, a very wide field, due to the spherical aberration of the reflector in its marginal part, whereas the combination of the transverse straight line dip filament, the cup, the aplanatic vertex zone of the reflector, and of the corresponding central zone of the lens results in a straight line image of the dip filament. The boundary plane of the beam is, however, not exactly flat over its whole width. This is due to the fact that the lower part of the dip filament may give rise after reflection in the substantially aplanatic part of the spherical section of the reflector and after refraction in the lens to some ascending rays, with respect to the boundary plane, as determined by the cup. Rays from the cup form on a vertical screen a central enlarged image having a sufficiently straight outline, although overlapping above the horizontal boundary line.

To overcome the above drawbacks, it was suggested in French Patent No. 837,080, dated October 15, 1937, the placing of the dip filament in such a position that its image is formed in the extension of the plane containing the cup edges, and behind the focal plane of the lens. This arrangement, however, causes a certain loss of beam power. On the other hand, as far as the long distance beam is concerned, the above device produces a too small central spot of which the intensity diminishes too little toward its periphery. This drawback cannot very well be overcome without a loss in axial power, as for example, by using a road filament having a vertical axis. The image of such a filament, formed by the reflector, is not however entirely free from the longitudinal aberration of the lens, resulting in a loss in power and in an insufficiently uniform beam, an effect which is still further increased through the passage of a part of the road beam through the central zone of the lens, which is provided for the dip beam. Finally, the necessity for providing in the center of the refractor lens a zone for the dip beam prevents the reduction to a minimum of the diameter of the refractor lens.

The headlight according to the object of the present invention employs also the principle of the separation of the road and dip beams into distinct surface areas on the optical elements constituting the lamp, in such a manner as to bring into proper focus both road and dip filaments with respect to the outlet lens, enabling therefore the elimination of the above-mentioned drawbacks of the prior devices. This headlamp is characterized by the feature that the reflector is comprised by separate sections having different functions, whereas the refractor is comprised by a lens having a single principal focus. By the single principal focus is understood here the meeting point of central rays parallel to the optical axis of the lens after being refracted when projected in the direction opposite to the normal direction; by the focal plane is meant the plane perpendicular to the optical axis and passing through the principal focus; by the aberration foci are understood meeting points, after refraction, of the marginal rays parallel to the optical axis of the lens. The distance between the principal and aberration foci on the optical axis represents the longitudinal aberration of the lens.

According to a preferred embodiment of the invention, the reflector is formed in two parts situated on the two opposite sides of the horizontal plane parallel to or passing through the optical axis of the lens, the upper part employed for dip illumination being approximately a segment of a sphere, at least in the zone adjacent the optical axis, the lower part, employed for long distance lighting, being approximately hyperbolic, at least in the region of the plane of vertical symmetry, the two, dip and road, filaments being placed in respect to the two reflector halves in such a manner that the two images formed by the zones adjacent the optical axis of the upper section and of the lower section of the reflector, respectively, are formed in the focal plane of the lens.

By way of an example, an embodiment of the headlamp according to the invention is described below and represented on the accompanying drawing, wherein:

Figure 1 represents diagrammatically, in sectional elevation, the optical system according to the invention;

Figure 2 represents the paths of the luminous rays for dip illumination, whereas the Figure 3 represents a section of this beam on a vertical plane, III—III situated at a certain distance in front of the headlight;

Figure 5 shows the lens in front view;

Figures 8a, 8b and 8c show in sectional elevation three alternative embodiments of the invention in which the reflector is formed by the wall of a double filament lamp;

Figures 9 and 10 show two embodiments of a lamp, the walls of which constitute, both, a reflector and a lens.

Figure 4:
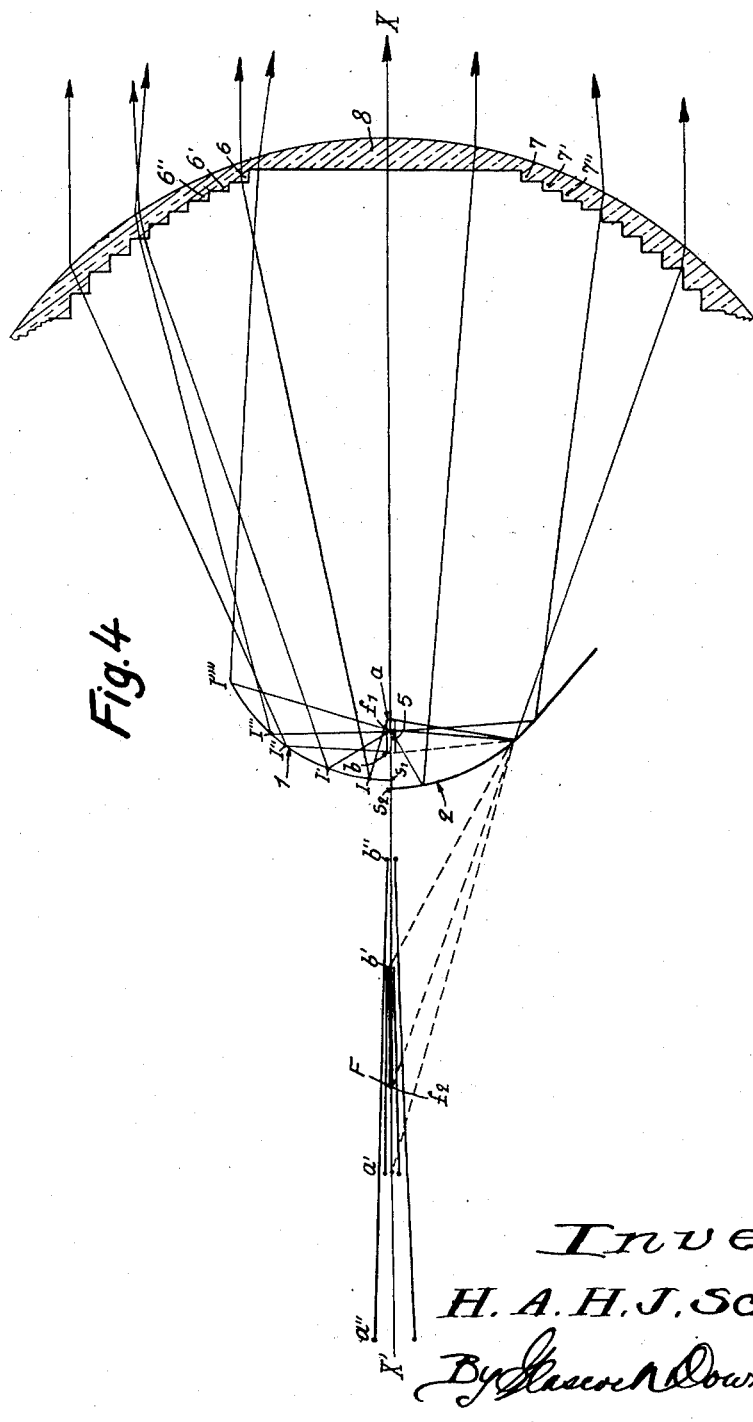
Figure 4 represents the paths of the long distance lighting rays.

As shown in Figure 1, the headlight according to the invention comprises a reflector R and a lens L. The reflector R is built up of two parts situated on two opposite sides of the horizontal plane passing through the optical axis X'X of the lens L. The upper section 1 of the reflector R, which is designed for dip illumination is for example of a spherical form, of center 0 and of focus $f$, whereas the lower section 2, which is designed for the long distance illumination, if formed, for example, by a hyperboloid of revolution about the optical axis X'X, comprising a front focus $f_1$ and a rear focus $f_2$. The dip filament 3 is straight and located transversely with respect to the optical axis X'X; it is placed slightly above said axis in a small screening cup 4 the edges of which lie in the plane Y'Y, which passes through the center 0 of the spherical section 1 of the reflector, and which determines the desired downward deflection of the dip beam after refraction through lens L. The road filament 5 is positioned along the optical axis X'X between the dip filament 3 and vertex of the reflector in such a manner that one of its end coincides with the focus $f_1$ of the lower hyperbolic section of the reflector in such a way as to form an image at $f_2$. The focus F of the lens L coincides with the rear focus $f_2$ of the hyperbolic section of the reflector 2, and the position of the dip filament 3 with respect to the focus $f$ of the spherical reflector 1 is determined so as to form at $3_1$, the intersection of the plane of cup edges Y'Y and the focal plane $P_F$ of the lens L, the image from the central aplanatic part of the spherical half of the reflector. The distance of the lens L from the reflector and its diameter are determined by space and lens efficiency considerations, whereas the parameters of the hyperbolic portion of the reflector are selected such that:

1. The divergent beam issuing from the reflector covers the whole surface of the lens, or at least that a ray issuing from either end of the filament, once reflected by the edge of reflector, falls on the edge of the lens, or slightly towards its centre.

2. The angle of incidence of the reflected ray on the edge of said lens does not exceed acceptable limits for a good refracting efficiency, the angle of incidence has to be sufficiently greater than the angle corresponding to a total deflection.

3. The distance between the filament and the wall of the reflector is sufficiently great to avoid any excessive heating of the silvered part, in particular in cases where the latter is formed on the lamp wall.

The hyperboloid being thus determined, the part of the sphere forming the upper half of the reflector will be positioned in such a manner that:

(1) The junction between the edges of the two reflector sections does not give rise to ascending rays in the dip beam; for this purpose, the spherical part will be shifted forwards with respect to the hyperbolic part.

(2) The displacement between the two reflector sections shall be as small as possible; for this reason the spherical section will be made tangent at the junction to the hyperbolic section.

Figure 2 shows the path of the rays forming the dip beam. In order to prevent the rays issued from the lower part of the dip filament being projected above the boundary plane of the beam, a drawback which was previously avoided, as pointed out above, by placing the filament more or less out of focus, the small aplanatic vertex zone of the spherical section of the reflector 1 has its centre $O_1$ displaced downwards, by translation or rotation, with respect to the centre $O$ of marginal aberration of this section of the reflector. The image $3_1$ of the filament is, therefore, formed entirely above the projected cup edges defining the plane $Y'Y$ and tangentially to this plane and the rays along this plane, after having been refracted by the lens parallel to $g_1B_1$, form the boundary plane. Accordingly, the lowest generatrix $g$ of the dip filament 3 projects with respect to the spherical part of the section 1 of the reflector an image $g_1$ and, therefore, a reflected ray $g_1AB$ which is then refracted by the lens L parallel to the straight line $g_1B_1$, which joins the image $g_1$ of the lowest generatrix $g$ to the centre $B_1$ of the lens, in such a manner that, as shown in the transverse section of the beam, Figure 3, the image of the filament is projected at 3', just below the boundary line $ZZ'$, Figure 3. The sharpness of the boundary line $ZZ'$ is not altered by this image, and there is no decrease in axial intensity of the beam. The highest ascending rays therefore, of all those issuing from the aplanatic lower part of the spherical section 1 of the reflector, are refracted by the lens L parallel to the line $g_1B_1$ in such a way that the beam leaving the central zone of the reflector is projected entirely below the downwardly inclined boundary plane. On the contrary, the rays reflected by the marginal aberration part of this spherical section of the reflector, such as for example the ray $g'A'B'$, are still more deflected by the lens L, in a manner to produce good illumination of approaches and the sides of the road. A straight line boundary beam is thus produced, having a high axial intensity and at the same time one that is quite broad.

In the case where a straight diffused boundary beam is preferred to the straight sharply defined beam, it is possible to obtain this result, for example, by means of horizontal steps suitably spaced on the lens, or by reducing to a certain extent the screening property of the cup.

Figure 4 shows the path of the rays forming the road beam. As has been pointed out above, the road filament 5 is placed at $ab$, along the optical axis $X'X$ of the lens with one of its ends coinciding with the front focus $f_1$ of the hyperbolic reflector section 2. The combination of an axial filament in an elongated form with a hyperbolic reflector having its focus not far from the vertex of the reflector produces a beam having a large central spot of gradually decreasing intensity. Furthermore, this filament forming in the marginal and central parts of the reflector section 2 elongated images such as $a'b'$, $a''$, $b''$ respectively, fully compensates for the longitudinal aberration $Fb'$ of the lens L and therefore provides a high axial intensity.

Figure 4A:
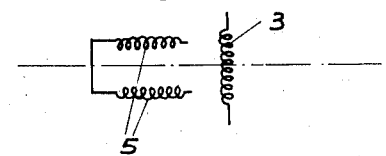
Figures 4a and 4b show in plan view and in elevation, respectively, an alternative disposition of the filaments.
Figure 4B:
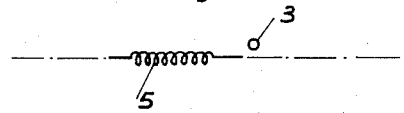
Figure 4C:
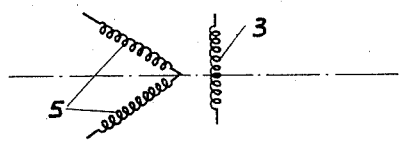
Figure 4c shows in plan view a modification of the long distance filament.

On the other hand, the upper spherical reflector section 1 also contributes to the formation of the long distance beam. In the case where the headlight lens is comprised by a Fresnel lens, which is provided with circular steps 6, 6', and 6'', these steps provide, through correcting the lens, for the focusing of the images of the different filament points in correspondence to the points of incidence of the corresponding rays on the spherical section 1 of the reflector. For example, the image of the rear end $b$ of the filament 3 will be focused at the incidence point $I''$, whereas the images of points of the filament situated nearer and at the front end $a$ of the filament will be focused at the points such as $I$ and $I'$ nearer the juncture of the reflector sections. The rays reflected by the highly aberrating marginal part of the spherical section 1 of the reflector will give rise to convergent rays such as that coming from $I''''$ and will be utilized for illuminating the road approaches and to increase still further the width of the long distance beam. It is possible, moreover, by means of the circular steps 7, 7', 7'' . . . provided on the lower half of the lens L, to correct for the longitudinal aberration $Fb'$ of the latter; although this correction would not be absolutely necessary, the axial road filament forming, as pointed out above, elongated images fully covering said longitudinal aberration. Nevertheless, in the case where more compact long distance beams are preferred, it would be more suitable to employ road filaments formed by two parallel lines, as shown in Figures 4a, 4b, or shaped in a V as shown in Figure 4c, in which case the correction by the steps might be necessary.

To avoid ascending and glaring rays in the dip beam, the central zone of the lens is preferably provided with vertical steps 8, 8', 8'' . . . , and the junctures between the vertical and annular steps is effected, for example, along the periphery 9 having the form of a barrel, Figure 5.

The shapes of the reflector sections mentioned above, for instance, the upper spherical reflector section 1 and lower hyperbolic reflector section 2 generated by revolution about the optical axis of the lens, do not constitute other than a preferred example of the invention, and it is possible, within the scope of the invention, to provide other forms of reflectors. In particular, reflector forms may be designed permitting the juncture of the upper and lower reflector sections to be more easily obtained. For example, the lower half may be comprised by a surface of revolution about a vertical axis, generated by rotation of a hyperbolic arc about this axis, said axis cutting the optical axis and passing through the centre of the upper spherical section of the reflector.

Figure 6:
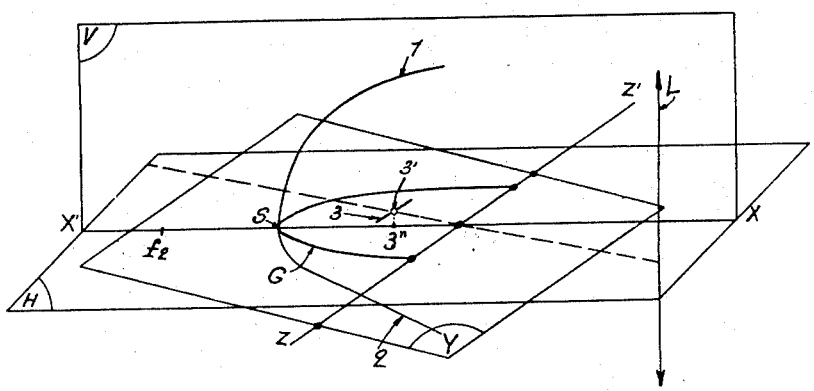
Figures 6 and 7 represent two different embodiments of the reflectors.

This upper spherical half of the reflector may also be comprised by a surface of revolution, the normals of which at an intersection of this surface with the plane surface defined by the cup edges, are all contained in said plane surface. For example, as shown in Figure 6, the upper reflector half 1 is formed by a surface of revolution, the generatrix of which is formed by intersection line G of the reflector half 2 with the horizontal plane H containing the optical axis $X'X$ of the lens L. The axis of revolution $ZZ'$ is horizontal and perpendicular to the optical axis $X'X$, which it intersects in a point, which is, according to the fundamental reflection law, in harmonic relation in two vortices of the reflector, on the one hand, with respect to the focus $f_2$ of the lower reflector half, and on the other hand, with respect to the projection 3" on the optical axis of the intersection point 3' of the dip filament 3 with the vertical plane of symmetry V; the plane Y—Y', as before, being defined by the edges of the screening cup 5, passes through the axis of revolution axis ZZ'. In this latter device, the two reflector halves 1 and 2 have a common intersection line with the horizontal plane H in a way that they meet in alignment without any relative displacement at the vortices.

Figure 7A:
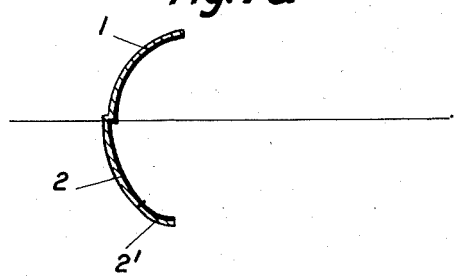
Figure 7a shows a modification of the lower part of the reflector.
Figure 7:
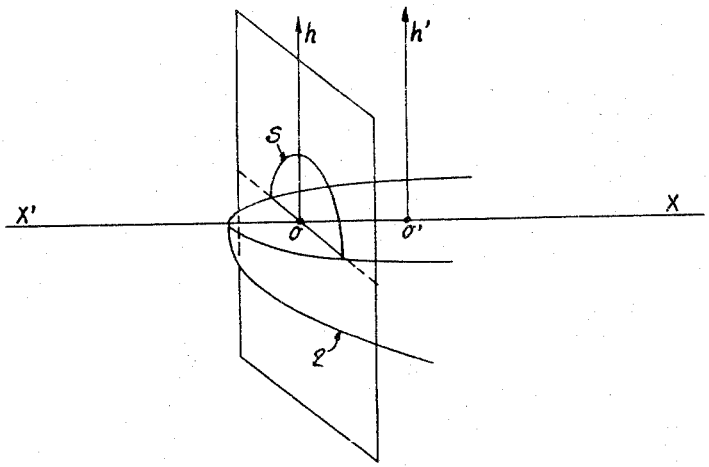

Similarly, the upper reflector half may be comprised by a surface based on the intersection curve of the lower reflector with the horizontal plane H, and the intersecting curves of which with the vertical planes are all circles having the same or different radii. In a particular case, shown in Figure 7, the plane S of these circular sections passes through the vertical line $oh$ of the centre of the circle of osculation at the vertex, or through the vertical line $o'h'$ of the centre of the circle of osculation at the edges of the lower reflector half 2, or through the vertical line through the centre of any circle of osculation of the reflector half 2.

The small vertex zone of the reflector half 1 will be made preferably nearly spherical, a result, which can be obtained by a slight deformation of the above defined surfaces.

The intersection of the lower reflector half 2 by the horizontal plane H may be hyperbolic or substantially circular. For example this lower reflector half may be generated by the rotation of an arc of a hyperbola positioned in a vertical plane and based on a director curve of substantially circular shape located in the plane H. Reflectors built in such a manner may furthermore be extended outwardly, Figure 7a, by one or more concave annular surfaces 2 joined to the hyperboloid 2.

The junction plane of the two reflector halves may be situated slightly below the horizontal plane X—X' through the optical axis, for example, at a distance of the order of 2 to 3 mm. from it, in a manner to ensure that the flux of the dip filament falls on the reflector entirely above the junction line in spite of tolerances of positioning of the filament in the screening cup, while the incident points of these rays on the spherical section 1 of the reflector vary greatly with these tolerances due to the small distance between the filament and the cup edges. Any possible deviation of the beam boundary plane with respect to the junction plane is thus eliminated.

According to a preferred embodiment of the invention shown in Figure 8, the dissymmetric reflector is constituted by the rear wall 11—12 of a molded glass bulb of a lamp containing two filaments 3, 5 and a screening cup 4, this wall being for this purpose silvered either internally or externally. The displacement of the vortices $S_1$ and $S_2$ of the two reflector halves is of the order of 1.5 mm.; that is to say about twice the thickness of the bulb glass, which construction does not involve any difficulties in production.

For example, in a particular embodiment, the spherical reflector half 11 has a radius of the order of 40 mm.; the dip filament 3 is placed at about 5 mm. behind the focus $f$ of this reflector half and at about 1.5 mm. above the optical axis of the system. The length of the road filament is here 6 mm.

The same bulb may of course be employed with lenses of different fields, such as L, Figure 8a; L", Figure 8b; L''', Figure 8c; etc.

The optical system according to the present invention is especially advantageous in the case of small diameter compound headlights, where the headlight may be constructed as shown in Figures 9 and 10, the lens being comprised by the front wall 14 of the bulb 13, which will include for this purpose molded steps 6, 7, and 8, as in the case of a separate lens. This lens is usually plano-convex or sphero-cylindrical. In some cases, it might be advantageous to provide on the lens faces having different curvatures in two perpendicular directions, in order to influence in different directions the beam spread in height or in width, respectively. According to space considerations, it may be possible to construct these headlamps with a greater or lesser depth. The reduction in depth, Figure 10, is necessarily followed by an increase in the reflector diameter, which approaches towards that of the lens, but in this case, in order to obtain a convenient ratio, it is preferable to increase slightly the diameters of these two elements.

I claim:

1. In a headlight the combination of a single focus lens positioned so as to have its optical axis horizontal, a reflector located between the lens and the focus of said lens and constituted by two reflector sections having different shapes and situated on the opposite sides of a horizontal plane parallel to the optical axis of the lens, the section of said reflector above said plane being substantially spherical about a center on the optical axis of the lens and having a focus on said axis, and the section of said reflector below said horizontal plane being substantially hyperbolic and having front and rear foci on said optical axis, the rear focus of said hyperbolic section coinciding with the focus of the lens, a dip filament having its longitudinal axis horizontal and normal to the vertical plane containing said optical axis and positioned between the vertex of the upper reflector section and its focus whereby the image of said dip filament formed by the upper spherical section of the reflector lies in the focal plane of the lens, a screening cup for said filament having its upper periphery lying in a plane perpendicular to the vertical plane containing the optical axis and crossing said optical axis substantially at said center of the upper spherical reflector section and a road filament having a longitudinal vertical plane of symmetry passing through the optical axis of the lens and a longitudinal axis at least in close juxtaposition to the optical axis and positioned between said lens and said reflector at least adjacent to the front focus of the lower hyperbolic reflector section.

2. In a headlight, the combination of a single focus lens positioned so as to have its optical axis horizontal, a reflector located between said lens and the focus of said lens and constituted by two sections having different shapes and situated on opposite sides of a horizontal plane parallel to the horizontal plane containing the optical axis of the lens, the section of said reflector above said first-mentioned plane being substantially spherical about a center on the optical axis of the lens, and having a focus on said axis and the portion of said reflector below the said first-mentioned horizontal plane being substantially hyperbolic and having front and rear foci on the said optical axis, the rear focus coinciding with the focus of the lens, a dip filament having its longitudinal axis horizontal and normal to the vertical plane containing the optical axis of the lens and positioned closely superjacent said axis and between the vertex of the upper reflector section and the focus of said section a distance from the latter such that the image of said dip filament formed by the upper spherical reflector section lies in the focal plane of the lens, a screening cup for said filament having its periphery lying in a plane containing the horizontal longitudinal axis of the dip filament, crossing the optical axis of the lens at the center of the upper spherical reflector portion and perpendicular to the vertical plane through the optical axis and an elongated road filament having a longitudinal vertical plane of symmetry passing through the optical axis of the lens and having its end adjacent the lens coinciding with the front focus of the lower hyperbolic section of the reflector.

3. A headlight as defined in and by claim 2 in which the dip filament is cylindrical and the road filament is cylindrical and has its longitudinal axis coinciding with the optical axis of the lens.

4. A headlight as defined in and by claim 2 wherein the dip filament is cylindrical and the road filament comprises two cylindrical portions having their respective longitudinal axes lying in the horizontal plane containing the optical axis of the lens on opposite sides of said optical axis and in parallelism therewith.

5. A headlight as defined in and by claim 2 wherein the dip filament in cylindrical and the road filament is V-shaped in plan and lies in the horizontal plane containing the optical axis of the lens with its longitudinal axis of symmetry coinciding with said optical axis.

6. A headlight as defined in and by claim 1 wherein the lower reflector section is formed by a hyperboloid of revolution about the optical axis of the lens.

7. Headlight according to claim 1, wherein the small aplanatic vertex zone of the upper spherical reflector section has its center located below the center of its marginal aberrating zone.

8. A headlight as defined in and by claim 1 wherein the lower reflector section is a hyperboloid having as its axis a vertical line lying in the vertical plane containing the optical axis of the lens.

9. A headlight as defined in and by claim 1 wherein the lower reflector section embodies different areas including an outer rim area, the area between the rim area and the optical axis of the lens constituting a hyperboloid and the rim area constituting a concave half annulus in continuation of the hyperboloid.

10. A headlight as defined in and by claim 1 wherein the vertex of the lower hyperbolic reflector section is disposed rearwardly of the vertex of the upper spherical reflector section.

11. A headlight as defined in and by claim 1 wherein the radius of osculation at the vertex of the lower hyperbolic reflector section is less than the radius of osculation at the vertex of the upper spherical section.

12. A headlight as defined in and by claim 1 wherein one face of the lens has different curvatures in two planes at right angles with one another.

13. In a headlight, a single focus lens positioned so as to have its optical axis horizontal and the focal point thereon, a reflector comprised by an upper spherical section positioned above the horizontal plane through the optical axis, and having its center and focal point thereon, and a second hyperbolic section positioned below the said horizontal plane with front and rear focal points on the optical axis and the rear focal point coinciding with the focal point of the headlight lens and the front focal point intermediate the vertices of the upper spherical and the lower hyperbolic sections of the reflector and the headlight lens, a substantially straight line dip filament having its longitudinal axis positioned horizontally and normal to the vertical plane through the optical axis and positioned above and in close juxtaposition to the horizontal plane containing the optical axis and intermediate the vertex of the spherical section of the reflector, adjacent the optical axis and the focal point of the upper spherical section of the reflector, whereby the image of said dip filament formed by the upper spherical section of the reflector lies in the focal plane of the headlight lens, a screening cup partially enclosing said dip filament and having an upper edge positioned inward of the spherical section of the reflector defining a boundary plane between the dip and road beams through the center of the upper spherical section of the reflector and normal to the vertical plane through the optical axis, and a substantially straight line road filament positioned within the vertical plane through the optical axis of the lens and between said lens and the vertices of the upper spherical and lower hyperbolic sections of the reflector and adjacent the front point of the lower hyperbolic section.

HENRI ALEXANDRE HIPPOLYTE
JOSEPH SCHAFFNER.

REFERENCES CITED

The following references are of record in the file of this patent:

UNITED STATES PATENTS

| Number | Name | Date |
|---|---|---|
| 254,578 | Wheeler | Mar. 7, 1882 |
| 1,136,507 | Clark | Apr. 20, 1915 |
| 1,216,910 | Ames, Jr. | Feb. 20, 1917 |
| 1,306,511 | Ames, Jr. | June 10, 1919 |
| 1,336,602 | Winston | Apr. 13, 1920 |
| 1,385,429 | Crockett et al. | July 26, 1921 |
| 1,756,301 | Pech | Apr. 29, 1930 |
| 1,887,574 | Berg | Nov. 15, 1932 |
| 2,006,140 | Honing | June 25, 1935 |
| 2,112,411 | Schaffner | Mar. 29, 1938 |
| 2,134,558 | Howard et al. | Oct. 25, 1938 |
| 2,146,593 | Roper | Feb. 7, 1939 |
| 2,219,848 | Schaffner | Oct. 29, 1940 |